Patented Sept. 20, 1949

2,482,236

UNITED STATES PATENT OFFICE 2,482,236

MULTIPLE IMPREGNATION OF PAPERMAKERS' FELT

Orion William Berglund, Dayton, Ohio, assignor to The Orr Felt & Blanket Company, Piqua, Ohio, a corporation of Ohio No Drawing. Application September 19, 1946, Serial No. 697,903

3 Claims. (Cl. 117—140)

This invention relates to felts for paper making or like machines and to a method of preparing such felts.

It is an object of this invention to provide paper making or like felts which have a high degree of abrasion resistance.

It is another object of this invention to provide a method of impregnating felts for paper making or like machines by which the wet tensile strength of the filler threads and of the warp threads is considerably increased.

These and other objects are accomplished by impregnating the felt with an aqueous rubber emulsion or an aqueous emulsion of synthetic rubber, curing said rubber and thereafter repeating the steps of impregnating with a rubber emulsion and curing.

While rubbers of any kind are operative for the process of the invention, I found that acrylonitrile butadiene copolymer and neoprene give the best results. Emulsions having a concentration of from 10 to 30% rubber were found to be most satisfactory. The concentration of the emulsion for the first impregnation and that for the second impregnation are not dependent upon each other.

The felt usually contains more or less acid which originates from pretreating process; neutralization of this acid is necessary in order to obtain uniform impregnation of rubbers to the felts. If the acid is not neutralized, the impregnating solution will change from its alkali state to an acid state and the rubber or latex will precipitate or kick-out and be of no value as an impregnant. For this reason the impregnating emulsions are preferably given a pH above 7; this may be done by any alkaline solution. I have used ammonia solution with advantage for this purpose. The amount of alkali is dependent upon the pH of the rubber emulsion and upon the acid content of the felt.

The felts may be impregnated by any method known in the art; however, I prefer to apply the liquids by immersion. The time of immersion is adjusted according to the pick-up desired. A total pick-up of from 1 to 25% by weight of cured rubber with regard to the dried felt materials was found satisfactory, from 12 to 25% representing the preferred range.

If desired, wetting agents may be added to the rubber emulsion; Twitchell oil, for example was found most satisfactory for this purpose. The amount of wetting agent used, however, should not exceed 0.5% of the emulsion, because otherwise the abrasion resistance is too greatly impaired.

In the following a few examples are given which are for the purpose of illustration only, but not for that of limitation.

Example I

Emulsion for first impregnation:

|  | Grams |
|---|---|
| 40% emulsion of butadiene acrylonitrile copolymer | 100 |
| Water | 300 |
| Ammonium hydroxide | 5 |

The felt was dipped in the emulsion of the above composition and the excess thereof then removed by squeezing the felt. The felt was then cured at approximately 200 to 225° F. for about 3 hours. Thereafter, the felt was subjected to a second impregnating step. In this example the emulsion for the second treatment was the same as that used for the first step, and the felt was again squeezed in order to remove excess emulsion and then cured under the very same conditions as before. The total pick-up of rubber by these two steps amounted to 16%. The felt, after treatment, showed an increase of the abrasion resistance of 167% as compared with the untreated felt. The tensile strength in wet condition increased by 20% for the warp threads and by 22% for the filler threads.

Example II

First dip:

|  | Grams |
|---|---|
| Butadiene acrylonitrile copolymer (40%) | 100 |
| Water | 300 |
| Ammonium hydroxide | 5 |

Impregnation and curing were substantially carried out as in Example I.

Second dip:

|  | Grams |
|---|---|
| Butadiene acrylonitrile copolymer (40%) | 100 |
| Water | 700 |
| Ammonium hydroxide | 5 |

After curing, the total pick-up was ascertained to be 14%. The abrasion resistance increased by 117%, the wet tensile strength of the warp threads by 12% and that of the filler threads by 16%.

Example III

Rubber emulsion for first dip:

|  | Grams |
|---|---|
| Butadiene acrylonitrile copolymer (40%) | 100 |
| Water | 100 |
| Ammonia solution | 10 |

Emulsion for second dip:

|  | Grams |
|---|---|
| Butadiene acrylonitrile copolymer (40%) | 100 |
| Water | 300 |
| Ammonia solution | 10 |

The method of impregnation and curing was the same as in the previous examples. The total pick-up in this instance was 22%. The abrasion resistance increased 117%, the wet tensile strength of the warp threads 19% and that of the filler threads 17%.

*Example IV*

First dip:

| Butadiene acrylonitrile copolymer (40%) | grams | 100 |
|---|---|---|
| Water | do | 300 |
| Ammonia solution | do | 10 |
| Twitchell oil | per cent | 0.5 |

Second dip:

| Butadiene acrylonitrile copolymer (40%) | grams | 100 |
|---|---|---|
| Water | do | 300 |
| Ammonia solution | do | 10 |
| Twitchell oil | per cent | 0.5 |

The cured felts impregnated with the above solution in two steps had a total pick-up of 19%. The abrasion resistance increased 83%, the wet tensile strength of the warp threads 6% and that of the filler threads 10%.

It will be seen from the above examples that the tensile strengths and the abrasion resistance were favorably affected in each case. These increases also have a favorable effect on the service life of the felts and thus on the economy of the paper making process.

It will be understood that while there have been described herein certain specific embodiments of the invention, it is not intended thereby to have it limited to or circumscribed by the details given, since the invention is susceptible to various modifications and changes which come within the spirit of the disclosure and the scope of the appended claims.

I claim:

1. In a method of making felts for paper making machines, the steps of (a) impregnating paper makers felts with an emulsion of butadiene acrylonitrile copolymer having a solids content of from 10 to 30%; (b) curing said rubber at approximately 200 to 225° F. for 3 hours; (c) repeating impregnation with an emulsion of butadiene acrylonitrile copolymer having a solids content of from 10 to 30%; and (d) curing said rubber at about 200 to 225° F. for approximately 3 hours.

2. In a method of making felts for paper making machines, the steps of (a) impregnating paper makers felts with an emulsion of butadiene acrylonitrile copolymer; (b) curing said rubber at approximately 200 to 225° F. for 3 hours; (c) repeating impregnation with an emulsion of butadiene acrylonitrile copolymer; and (d) curing said rubber at about 200 to 225° F. for approximately 3 hours.

3. In a method of making felts for paper making machines, the steps of (a) impregnating paper makers felts with an emulsion of butadiene acrylonitrile copolymer; (b) mechanically removing the excess of the emulsion; (c) curing said rubber at approximately 200 to 225° F. for 3 hours; (d) repeating impregnation with an emulsion of butadiene acrylonitrile copolymer; (e) mechanically removing the excess of the emulsion; and (f) curing said rubber at about 200 to 225° F. for approximately 3 hours.

ORION WILLIAM BERGLUND.

REFERENCES CITED

The following references are of record in the file of this patent:

UNITED STATES PATENTS

| Number | Name | Date |
|---|---|---|
| 695,627 | Rosenberg | Mar. 18, 1902 |
| 1,964,771 | Schur | July 3, 1934 |
| 1,967,863 | Collins et al. | July 24, 1934 |
| 2,038,712 | Brodin | Apr. 28, 1936 |
| 2,327,573 | Walsh | Aug. 24, 1943 |
| 2,355,521 | Gauz | Aug. 8, 1944 |

OTHER REFERENCES

"Paper Trade J." of Nov. 5, 1942, pgs. 239 to 242 incl.